US007624439B2

(12) United States Patent
Koestler

(10) Patent No.: US 7,624,439 B2
(45) Date of Patent: Nov. 24, 2009

(54) AUTHENTICATING RESOURCE REQUESTS IN A COMPUTER SYSTEM

(75) Inventor: Luke Koestler, Vicksburg, MS (US)

(73) Assignee: Seventh Knight, Vicksburg, MS (US)

( * ) Notice: Subject to any disclaimer, the term of this patent is extended or adjusted under 35 U.S.C. 154(b) by 651 days.

(21) Appl. No.: 10/252,511

(22) Filed: Sep. 24, 2002

(65) Prior Publication Data
US 2003/0089675 A1   May 15, 2003

Related U.S. Application Data

(60) Provisional application No. 60/330,721, filed on Oct. 29, 2001, provisional application No. 60/339,163, filed on Dec. 13, 2001.

(51) Int. Cl.
| | |
|---|---|
| G06F 12/14 | (2006.01) |
| H04L 9/32 | (2006.01) |
| G06F 12/00 | (2006.01) |
| H04L 12/40 | (2006.01) |
| G06F 11/30 | (2006.01) |

(52) U.S. Cl. .............................. 726/16; 726/2; 726/17; 726/22; 726/26; 370/438; 713/193

(58) Field of Classification Search ................ 713/170, 713/822, 193; 715/741; 370/438; 726/2, 726/17, 16, 22, 26
See application file for complete search history.

(56) References Cited

U.S. PATENT DOCUMENTS

| 4,942,574 | A |   | 7/1990 | Zelle ........................ 370/85.15 |
|---|---|---|---|---|
| 5,471,459 | A |   | 11/1995 | Gut |
| 5,483,649 | A | * | 1/1996 | Kuznetsov et al. ............ 726/22 |
| 5,564,016 | A | * | 10/1996 | Korenshtein ................... 726/3 |
| 5,610,981 | A | * | 3/1997 | Mooney et al. ............. 713/185 |
| 5,699,513 | A |   | 12/1997 | Feigen et al. |
| 5,740,367 | A | * | 4/1998 | Spilo .......................... 709/201 |
| 5,832,269 | A | * | 11/1998 | Dollinger et al. ............ 717/107 |
| 5,899,987 | A |   | 5/1999 | Yarom |
| 5,913,043 | A | * | 6/1999 | Carter et al. ................ 710/100 |
| 5,925,126 | A | * | 7/1999 | Hsieh ........................... 726/19 |
| 5,960,172 | A |   | 9/1999 | Hwang |
| 5,974,549 | A | * | 10/1999 | Golan .......................... 726/23 |
| 6,141,757 | A | * | 10/2000 | Seeker et al. .................. 726/22 |
| 6,412,071 | B1 | * | 6/2002 | Hollander et al. ............. 726/23 |
| 6,418,472 | B1 | * | 7/2002 | Mi et al. ...................... 709/229 |
| 6,658,571 | B1 | * | 12/2003 | O'Brien et al. ............... 726/26 |

(Continued)

OTHER PUBLICATIONS

Communication pursuant to Article 96(2) EPC mailed Jun. 12, 2007 in corresponding EP Application No. 02 778 289.5-1245.

(Continued)

Primary Examiner—Christopher A Revak
Assistant Examiner—Trang Doan
(74) Attorney, Agent, or Firm—Finnegan, Henderson, Farabow, Garrett & Dunner L.L.P.

(57) ABSTRACT

Systems and methods consistent with the present invention authenticate resource requests in a computer system having a resource controller and a bus. Such systems and methods may monitor the bus for resource requests made to the resource controller, intercept at least one resource request made to the resource controller, determine if the intercepted resource request is authentic, and allow the intercepted resource request to be fulfilled by the resource controller if the resource request is authentic, and otherwise, allow the request to time out.

31 Claims, 5 Drawing Sheets

U.S. PATENT DOCUMENTS

| | | | | |
|---|---|---|---|---|
| 6,735,601 | B1* | 5/2004 | Subrahmanyam | 707/200 |
| 6,823,460 | B1* | 11/2004 | Hollander et al. | 726/3 |
| 6,848,106 | B1* | 1/2005 | Hipp | 719/312 |
| 6,978,366 | B1* | 12/2005 | Ignatchenko et al. | 713/166 |
| 7,028,305 | B2* | 4/2006 | Schaefer | 719/310 |
| 2001/0056494 | A1* | 12/2001 | Trabelsi | 709/229 |
| 2002/0032863 | A1* | 3/2002 | Ha | 713/176 |
| 2002/0152230 | A1* | 10/2002 | Gusler et al. | 707/204 |
| 2002/0184521 | A1* | 12/2002 | Lucovsky et al. | 713/200 |
| 2003/0037252 | A1* | 2/2003 | Abrams | 713/200 |

OTHER PUBLICATIONS

Supplemental European Search Report mailed Feb. 8, 2007 in corresponding EP Application No. 02 778 289.5-1245.

PCT International Preliminary Examination Report mailed Dec. 29, 2003 in corresponding International Application No. PCT/US02/29851.

PCT Written Opinion mailed Jun. 20, 2003 in corresponding International Application No. PCT/US02/29851.

PCT International Search Report mailed Jan. 10, 2003 in corresponding International Application No. PCT/US02/29851.

* cited by examiner

AUTHENTICATING RESOURCE REQUESTS IN A COMPUTER SYSTEM

CROSS REFERENCE TO RELATED APPLICATIONS

This application claims the benefit under 35 U.S.C. § 119(e) of U.S. Provisional Patent Application No. 60/339,163, filed Dec. 13, 2001, and of U.S. Provisional Patent Application No. 60/330,721, filed Oct. 29, 2001, each of which are incorporated herein by reference, in their entirety.

FIELD OF THE INVENTION

This invention relates to the field of computer resource security. More particularly, this invention relates to a method and apparatus for authenticating resource requests made to the operating system of a computer system.

BACKGROUND OF THE INVENTION

A resource request is a request generated by a computer system entity, such as a software application or a hardware device, by which the entity requests the use of certain system resources. Such resources may include the use of a hardware resource such as the display screen for writing to the screen, a software resource such as opening a new window in a Windows based system, accessing a network resource, such as an internet address, or any other resource controlled by an operating system. Typically, such requests are made to the operating system of the computer, as the operating system is typically the entity charged with resource allocation. Theoretically, however, the request can be made to any computer system software or hardware entity charged with resource allocation.

One example of a resource request is an Application Programming Interface (API), used by the Windows™ operating system. API's are function calls used by programmers to request the use of resources from the operating system. For example, in the case of Windows API's, a programmer need not program each new application to perform tasks such as drawing on the monitor, accessing a disk, writing to the printer, using an internet resource, or performing other functions. Instead, the API allows the programmer to request that the operating system perform these functions.

Resource requests are fulfilled whenever the device or resource requested is available. However, a computer user or administrator may wish to limit access to certain computer resources. For example, an administrator may wish to limit memory access to only those applications initiated on the same computer as the memory. This feature ensures that confidential files are accessed only by authorized individuals. In addition, many computer viruses utilize computer resource requests as the means of accessing or damaging computers. For example, a virus trying to access memory via an API request can destroy valuable files, or a virus accessing an internet connection can control or monitor email and other sensitive communications.

Process authentication is a means of assuring that a computer entity requesting a resource, and the user controlling it, have the proper authorization to use the desired resources. Process authentication introduces a layer of security, which monitors and filters out unwanted or un-permitted API calls, so that they will never be fulfilled by the operating system, or other entity in charge of resource allocation. As a result, the process authentication system can effectively lock out unpermitted user intrusions, unwanted applications or viruses, and prevent unauthorized access to system resources by users or applications.

SUMMARY OF THE INVENTION

Systems and methods consistent with the present invention authenticate resource requests in a computer system having a resource controller and a bus. Such systems and methods may monitor the bus for resource requests made to the resource controller, intercept at least one resource request made to the resource controller, determine if the intercepted resource request is authentic, and allow the intercepted resource request to be fulfilled by the resource controller if the resource request is authentic, and otherwise, allow the request to time out.

Additional benefits of the invention will be set forth in part in the description which follows, and in part will be obvious from the description, or may be learned by practice of the invention. The benefits of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION

Reference will now be made in detail to exemplary embodiments of the invention, examples of which are illustrated in the accompanying drawings. Wherever possible, the same reference numbers will be used throughout the drawings to refer to the same or like parts.

A resource request is a request generated by a computer system entity, such as a software application or a hardware device, by which the entity requests the use of certain system resources. While different operating systems may provide a different set of resources available to applications or hardware devices, and may implement resource requests using different formats, in most systems the requests are transmitted to the operating system, or other resource controller, via the system bus. For example, the Windows™ operating system allows computer system entities to request resources using API calls or declarations. The formats, protocols, procedures and details for using API declarations are openly published in Visual C++ editors, Visual Basic editors or other Windows programming tools for use by Windows-based application programmers. Operating systems or platforms other than Windows™ may instead use different formats or procedures for their resource requests. One of ordinary skill in the art will recognize that the present invention is not limited to use with Windows-based computers and its associated API requests. For simplicity in explanation, however, the following discussion will refer to API requests used in Windows-based computers.

Figure 1:
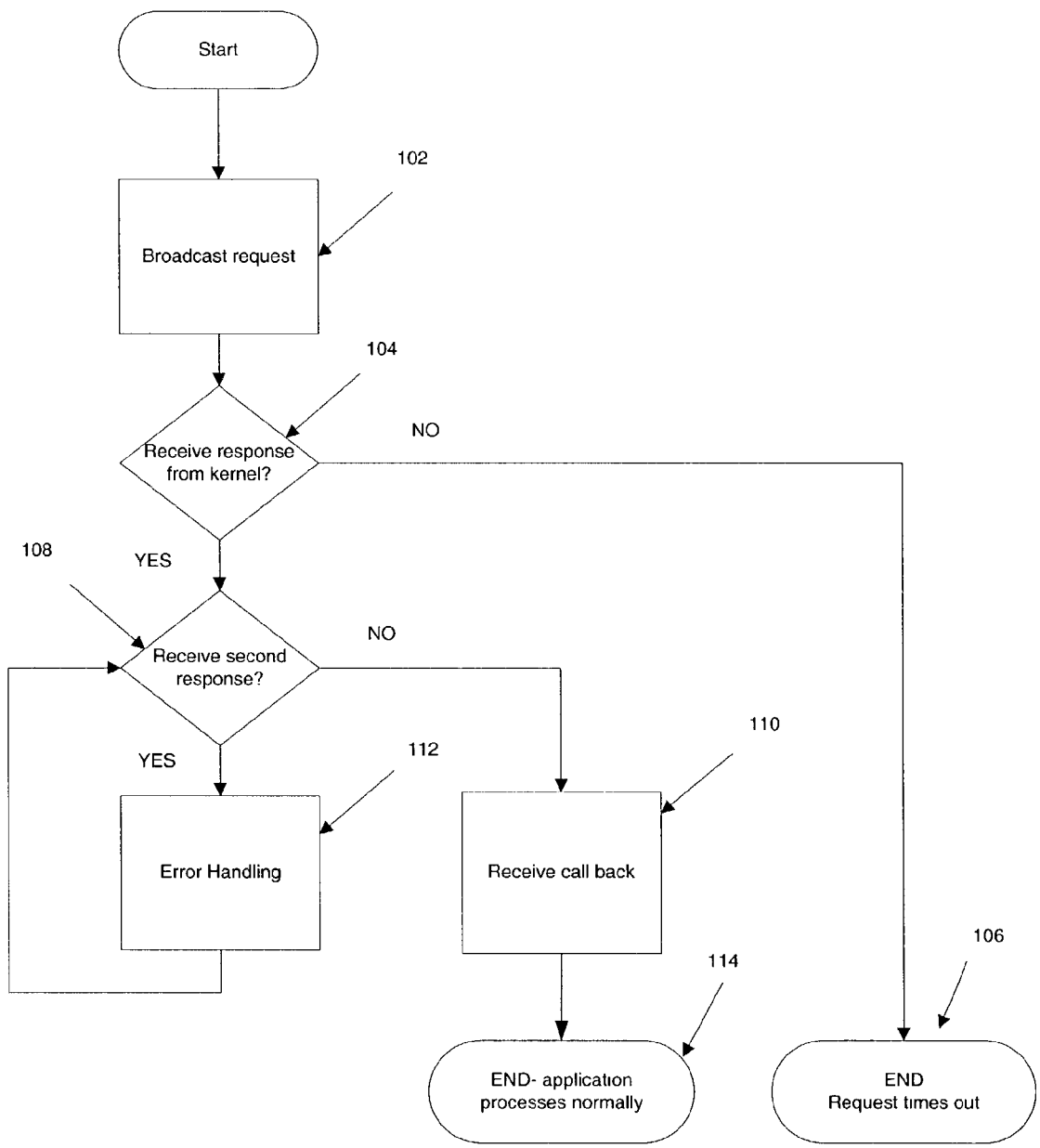
FIG. 1 shows a flowchart depicting the steps performed by a requesting application making an API request consistent with the processing of a Windows-based computer.

FIG. 1 depicts a flowchart showing the steps performed by a processing application to gain access to a system resource consistent with the typical operation of a Windows-based computer. Process 100 begins when a requesting entity broadcasts a request to the operating system, step 102. In Windows-based computers, each resource that may be requested has a specific, predetermined, API declaration (request) which must follow a specific format. The API request commands the operating to allocate the identified resource to the requesting entity or to perform a certain task (predetermined set of instructions) for the requesting entity. A list of known API calls is available with any Visual C++ editors, Visual Basic editors or other Windows programming tool. In addition, new API calls are always being developed by programmers, and one of ordinary skill in the art will recognize that the present invention is not limited to currently available resource requests.

In step 102, the requesting entity transmits an API request to the operating system by broadcasting a message across the system bus. The API request will contain the information required by the API's format or definition, as well as a header including certain identification information, such as the process ID of the sending application, and possibly other information. In Windows-based computers, the requests are broadcast by the requesting application across the system bus such that the operating system and all applications can "hear" it. Each application and hardware device listening to the system bus will parse the request upon receipt to determine if the message is intended for it. When the operating system receives and parses an API request, it will identify the request as a resource request and proceed with fulfilling the request, as further described below by FIG. 2. All other applications and hardware devices will recognize that the message is not intended for it, and will ignore the API request.

The requesting application will then listen for a response to its request, step 104. The format of the response is similarly dictated by the operating system platform, and in Windows-based systems, is a standard command also disclosed in Visual C++ editors, Visual Basic editors, and other Windows™ programming tools. Responses to API requests, which are also broadcast over bus, typically do not include header information identifying the sender of the message. Instead, the requesting application assumes that the operating system is the sender, because, in the typical course of processing, only the operating system would respond to a request. The response will notify the requesting application of the request's receipt and pending processing. If, at step 104, the requesting application does not receive the response, then the request times out, step 106. Applications are typically programmed to wait only a predetermined amount of time for a response in order to prevent processing from being suspended indefinitely (if no response was received). A "time out" means that no response to the request was received in the allotted time. In response to a timeout, the requesting application may simply give up on the request or may generate an error message for the user, alerting the user that a specific function cannot be completed. In addition, the error-handling routines of the requesting application may facilitate a return to normal processing as if the request were never made.

If, however, at step 104, the requesting application received a response from the operating system, the requesting application will await the fulfillment of the request. In the meantime, it will be listening for additional (i.e. second, third, etc.) responses from the operating system, step 108. In Windows-based systems, a typical method for returning processing to the requesting application is to use a call-back request. If, at step 108, the requesting application received a second response to the resource request, before receiving the call-back request, the requesting application will generate a software error. The error-handling routines of the requesting application will handle the error, and may do so by displaying an error message alerting the user that an error has occurred, step 112. The error-handling routines may also allow processing of the requested application to proceed on its normal course despite the error. Processing will then return to step 108, where the application continues to wait for the operating system to process the resource request and send the call back function. If the routine receives another subsequent response to the resource request, it will repeat step 112.

If, instead, at step 110, the requesting application receives a call-back function from the operating system indicating that the request has been fulfilled, the requesting application will continue processing on its normal course, step 114.

Figure 2:
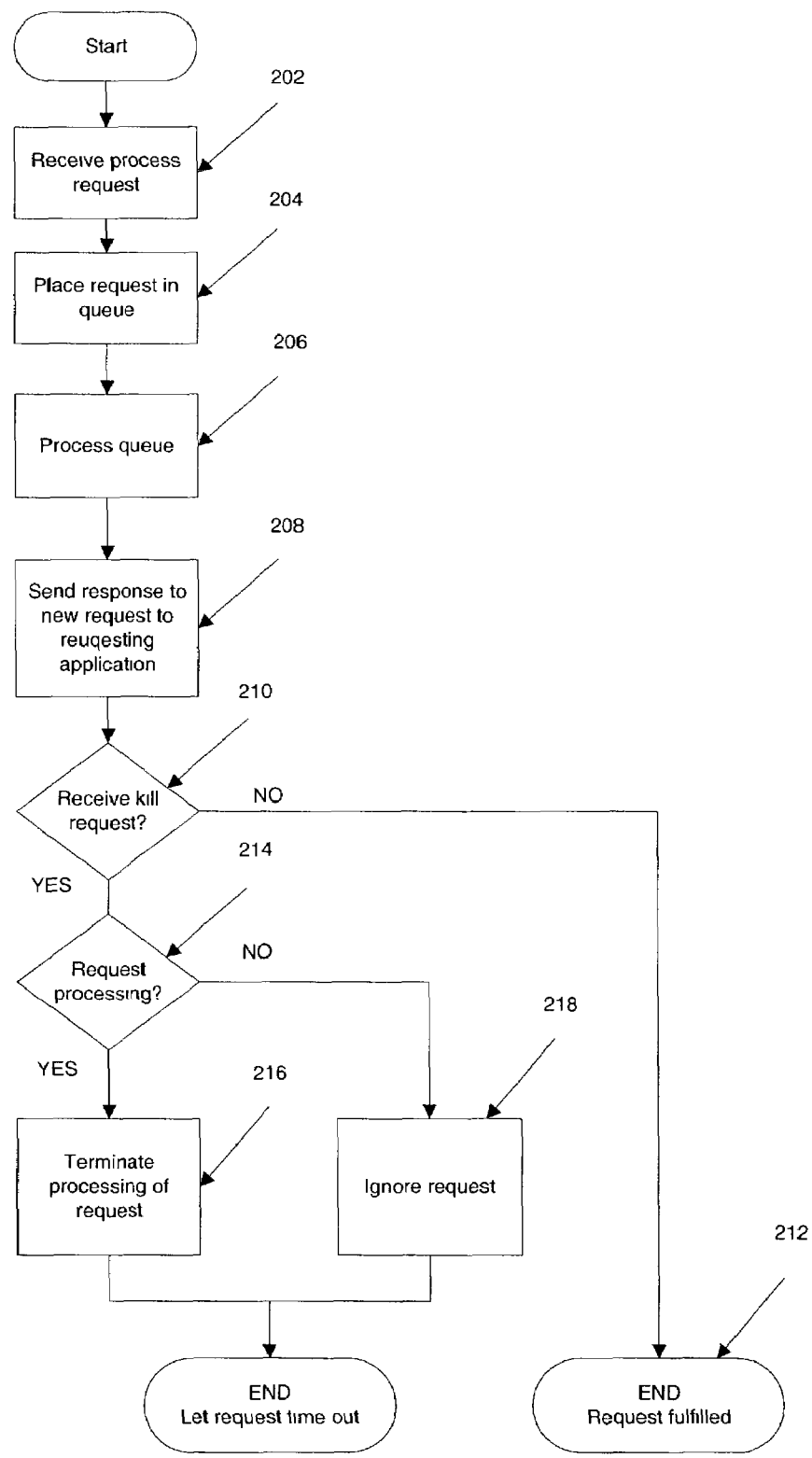
FIG. 2 shows a flowchart depicting the steps performed by the operating system of a Windows-based computer to respond to an API request consistent with the typical processing of a Windows-based computer.

FIG. 2 shows a flowchart depicting the steps performed by a Windows-based operating system to respond to and fulfill a resource request. The operating system listens to all transmissions broadcast across the system's bus. The operating system identifies each resource request (API request) from the transmitted messages by parsing each messages' predefined format and header information. Upon receiving and identifying a resource request, step 202, the operating system places the resource request in the queue of processing routines for the processor to process, step 204. As the processor processes the routines in the queue, step 206, eventually, the resource request will be the next item in the queue.

When the processor begins processing the resource request, the operating system will send a response to the requesting application, step 208. This response communicates to the requesting entity that the request was received, and is being processed. The operating system can identify the sender of the request from the process identification, included in the header of the API message. The response will be sent to the process identified by the process identification and will take the form required by the operating system and by the request declaration. It is possible in Windows-based computers that the order of steps 204, 206, and 208 may change, in other words, the response may be sent to the requesting application upon receipt of the initial request and before the resource request is placed in the queue. One of ordinary skill will recognize that the ordering of the steps here is not important to the present invention.

The operating system may also receive a request to kill the processing of a resource request, step 210. For example, such a request may result from a user's attempt to shut down the computer or the requesting application. The kill request may be sent by the requesting application or by another application. If the operating system does not receive a termination request, then the operating system continues to process the resource request, step 212. In this case, the operating system's processing will terminate naturally (the request will be fulfilled) and the operating system will return processing to the application by sending a call back request to the requesting application.

If, however, the operating system does receive a kill request, then it will terminate the processing of the resource request. If the resource request is currently processing, step 214, then the operating system will terminate the processing of the request, step 216. If, however, the resource request is not currently processing, then the operating system will simply ignore the request, and never attempt to process it, step 218. In either case, the resource request will not be fulfilled.

Systems and methods consistent with the present invention introduce a layer of security to authenticate resource requests prior to fulfillment of the request by the operating system, otherwise referred to as process authentication. In this way, only permitted applications, hardware devices and users may be permitted access to certain system resources.

Figure 3:
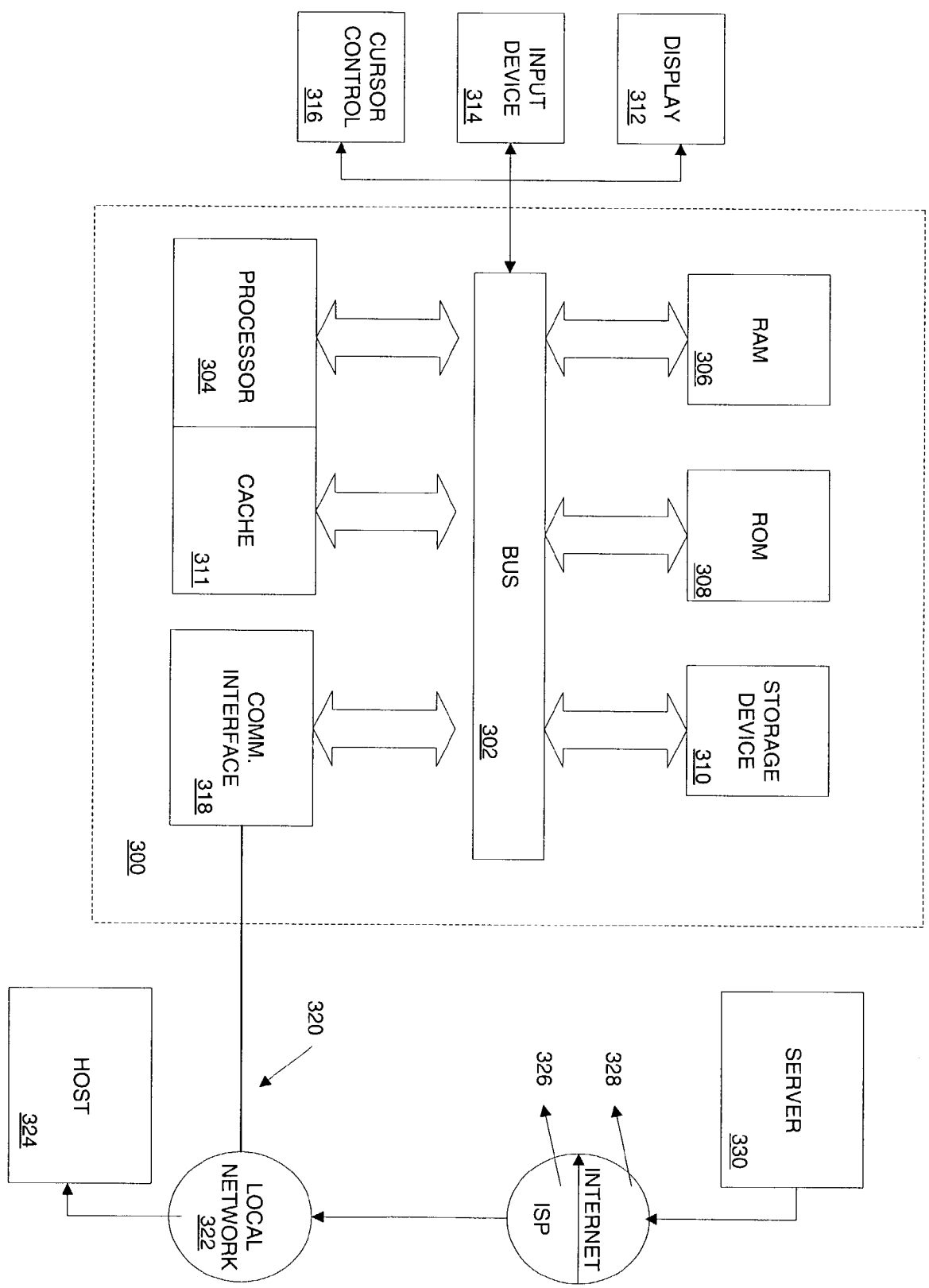
FIG. 3 depicts an exemplary computer in which the systems and method of the present invention may be implemented.

Process authentication may be implemented by computers organized in a conventional distributed processing system architecture. FIG. 3 is a block diagram that illustrates a computer system 300 upon which an embodiment of the invention may be implemented. Computer system 300 includes bus 302 or other communication mechanism for communicating information, and processor 304 for processing information coupled with bus 302. Computer system 300 also includes a main memory, such as random access memory (RAM) 306 or other dynamic storage device, coupled to bus 302 for storing information and instructions to be executed by processor 304. RAM 306 also may be used for storing temporary variables or other intermediate information during execution of instructions to be executed by processor 304. Computer system 300 may also include cache 311 for storing temporary variables and other information and instructions from RAM 306. It is possible that RAM 306 may not be able to store all information, instructions and variables necessary for processor 304 to run an application. In this case, the instructions, variables, and other information may be moved into cache 311 for temporary storage according to numerous well-known methodologies. This data can be stored in cache 311 until processor 304 requires the information or instructions. When needed, it can be accessed at speeds faster than if it were located in storage device 310 or another form of storage medium. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to display 312, such as a cathode ray tube (CRT), for displaying information to a computer user. Input device 314, including alphanumeric and other keys, is coupled to bus 302 for communicating information and command selections to processor 304. Another type of user input device is cursor control 316, such as a mouse, a trackball or cursor direction keys for communicating direction information and command selections to processor 304 and for controlling cursor movement on display 312. This input device typically has two degrees of freedom in two axes, a first axis (e.g., x) and a second axis (e.g., y), which allow the device to specify positions in a plane.

Aspects of the invention involve the use of computer system 300 to authenticate resource requests made to an operating system. According to one implementation, a process authentication routine, running on computer system 300 intercepts and authenticates each resource request made to an operating system in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In an alternative implementation, hard-wired circuitry may be used in place of or in combination with software instructions to implement the invention. Thus, implementations consistent with the principles of the present invention are not limited to any specific combination of hardware circuitry and software.

The term "computer-readable medium" as used herein refers to any media that participates in providing instructions to processor 304 for execution. Such a medium may take many forms, including but not limited to, non-volatile media or volatile media. Non-volatile media includes, for example, optical or magnetic disks, such as storage device 310. Volatile media includes dynamic memory, such as main memory 306.

Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, or any other memory chip or cartridge.

Various forms of computer-readable media may be involved in carrying one or more sequences of one or more instructions to processor 304 for execution. For example, the instructions may initially be carried on the magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector coupled to bus 302 can receive the data carried in the infra-red signal and place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to host computer 324 and/or to data equipment operated by Internet Service Provider (ISP) 326. ISP 326, in turn, provides data communication services through the Internet 328. Local network 322 and Internet 328 both use electric, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the present invention, one such downloaded application authenticates all resource requests made to a computer's operating system. The received code may be executed by processor 304 as it is received and/or stored in storage device 310, or other non-volatile storage for later execution. In this manner, computer system 300 may obtain application code in the form of a carrier wave.

Although computer system 300 is shown in FIG. 3 as being connectable to one server, 330, those skilled in the art will recognize that computer system 300 may establish connections to multiple servers on Internet 328. Each such server includes an HTML-based Internet application, which may provide information to computer system 300 upon request in a manner consistent with the present invention.

Systems and methods consistent with the principles of the present invention provide a process authentication routine for authenticating all resource requests made to the operating system of computer 300. According to one aspect of the invention, process authentication routine ensures that it is processing whenever computer 300 is powered on and processing, in order to ensure that all resource requests are authenticated.

Figure 4:
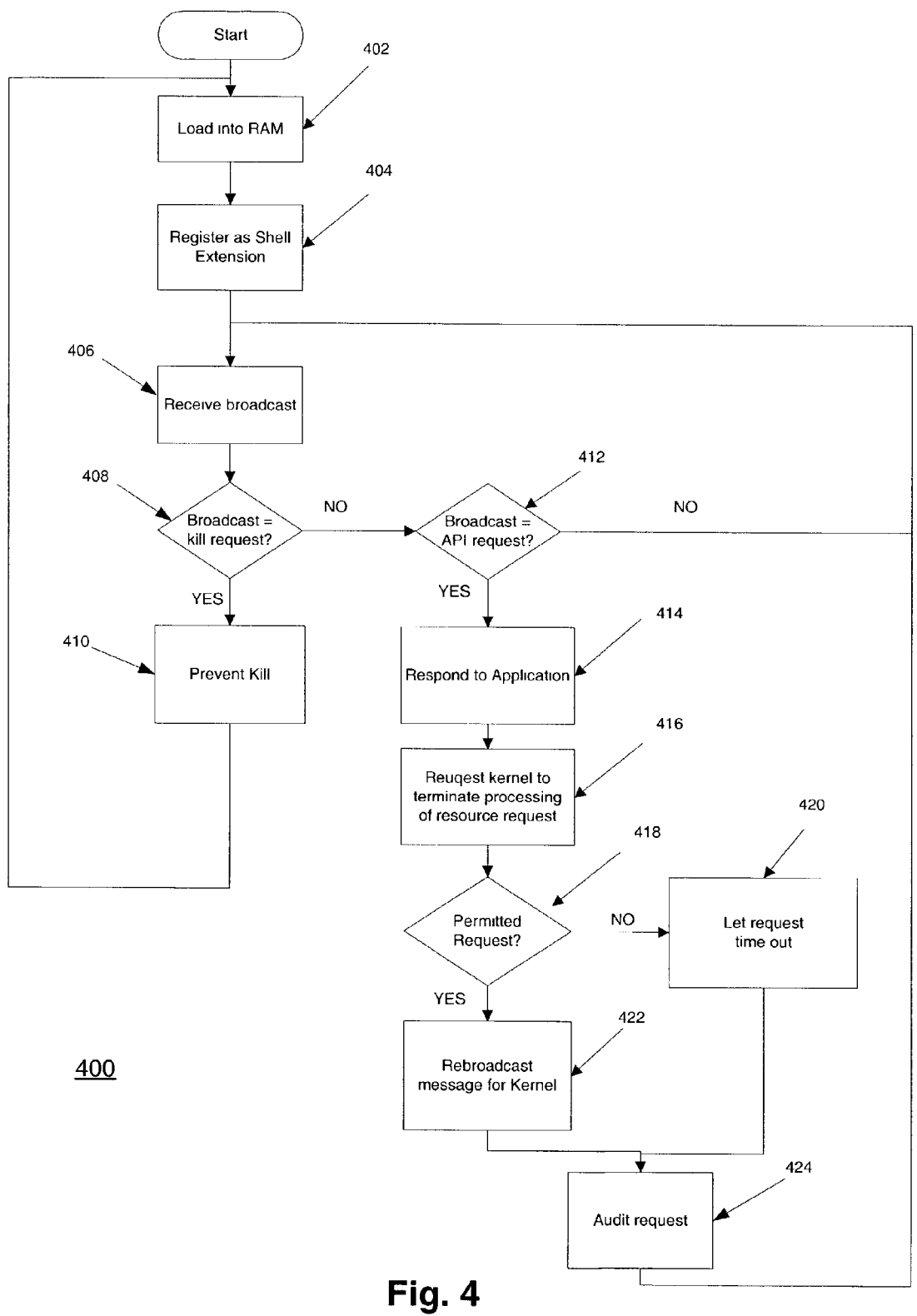
FIG. 4 shows a flowchart depicting the steps performed by a process authentication routine consistent with the principles of the present invention.

FIG. 4 depicts a flowchart showing the steps performed by process authentication routine 400, consistent with the principles of the present invention. According to one aspect of the invention, once computer 300 is turned on, instructions for carrying out the routine are loaded into RAM 306 for execution by processor 304, step 402. As previously described, loading may involve copying the contents of storage device 310 into RAM 306, or obtaining a copy of the routine from host 324 on network 322, or from server 330 via either internet 328 or ISP 326.

In addition, routine 400 registers itself as a shell extension, step 404. A shell extension is any application registered with, and recognized by the operating system, as part of the user's shell. Applications registered as shell extensions are afforded special treatment by the operating system in that they are never cached. In order to register as a shell extension, an application sends the registration API command to the operating system, and the operating system modifies the Window's system registry to identify the routine as a shell extension.

Process authentication routine 400, in operation, monitors system bus 302. Routine 400 will receive each message broadcast across system bus 302, step 406. For each message received, routine 400 determines if the request is a request to terminate process 400, i.e., a kill request, step 408. A kill request is a broadcast API request to the operating system requesting that a routine be terminated. If routine 400 is terminated, or killed, then the operating system will be free to process all resource requests made to it without authentication. Therefore, if the request is a kill request, then routine 400 will prevent its own termination, step 410. An exemplary method containing the steps taken by routine 400 to prevent termination are depicted in the flowchart in FIG. 5. Once the termination has been prevented, processing may then return to step 402, where routine 400 reloads into RAM to continue processing.

If, however, at step 408, the message is not a kill request, then routine 400 must determine if the broadcast message is an API request, step 412. Routine 400 parses all broadcast messages in order to identify any messages or resource requests (API declarations) made to the operating system. It identifies these broadcasts in the same manner as the operating system. If the message is not an API request, processing returns to step 406 where the routine awaits the next broadcast message.

If, at step 412, the message is an API request, then routine 400 authenticates the request, i.e., determines whether the request is authentic. In one configuration, routine 400 first intercepts the broadcast request, in order to provide time to authenticate the request. Routine 400, therefore, sends a response to the requesting application, step 414. This response to the requesting application mimics, i.e. is identical in all respects to, the response that the operating system would send to acknowledge the receipt of a resource request. In addition, process authentication routine 400 identifies the requesting application from the process identification in the header included with the API request. This response does not, however, include the process identification of the process authentication routine. This is done to insure that the response by the process authentication routine mimics any response that may have been sent by the operating system. The receipt of this response by the application will cause the requesting application to await the fulfillment of the request and the subsequent call back.

Routine 400 also sends a kill request to the operating system to terminate processing of the request, step 416. By requesting that the operating system terminate processing of the request, the process authentication routine has time to determine whether the request was authentic. Upon completion of step 416, routine 400 has intercepted the resource request, i.e., prevented the request from being fulfilled by the processor.

Processing then flows to step 418 at which routine 400 authenticates the request, i.e. determines if the request was authentic and/or permitted. To determine if a request is authentic, routine 400 may, in one configuration, maintain a list of permissions which indicate whether a specific request is permitted. The permissions list may be created, set, maintained, modified, and protected using any known methodologies. For example, the permission to use a request may be granted to a specific user, a group of users, a specific application, or based on any other characteristic of the computer system or its users. For each user or group, the user or administrator may, for example, grant or deny permission a specific resource or group of resources, such as the resource(s) necessary to 1) run applications, 2) use administrative tools, such as any tool which may affect multiple users (i.e., a device driver), 3) self authenticate a resource request, 4) manage disk resources, such as the right to control access to files or folders, 5) log on to a host, such as whether the user can log on remotely (i.e., across a network), 6) use network resources, such as the right to block or grant access to a port or IP address, or 7) access internet resources such as the right to access a given internet address. In addition, routine 400 may provide the ability for a user or administrator to set or modify permissions.

The permissions list may be kept in the form of a database or other form resident in memory on computer 100, or on a networked computer such as host 124 or server 130. The permissions may, in one configuration, be encrypted, using for example, known public or private key methods, thereby preventing unauthorized access to the permissions list. In addition, access to the permissions list may be implemented to require the use of API requests to access or modify the permissions list. In order to protect the permissions list, the administrator may set the permissions such that no user has permission to utilize the API requests necessary to access or modify the permissions list. In this way, no user application can access an application because the authentication routine will intercept the API request to access the file, determine the request is unauthorized, and prevent it from being fulfilled.

Therefore, at step 418, routine 400 accesses the permissions list to determine if the request currently pending is permitted. If the request is not a permitted one, then routine 400 does nothing. Because processing of the request by the operating system has already been terminated, the request will never be fulfilled. In addition, the requesting application will eventually time out, because the operating system will never send a call back to it, step 420.

If, however, at step 418, routine 400 determine that the request currently pending is a permitted one, it rebroadcasts the original request to the operating system. In this case, the rebroadcast will contain the process identification in the header of the requesting application. In one configuration, the process authentication routine may cache the original request, maintaining a copy in memory so that it may be rebroadcast in a form identical to the original request. By rebroadcasting the request, the operating system will once again begin processing the request. In addition, the operating system will send a response to the requesting application (as shown at step 208, FIG. 2). The requesting application, however, in this case will already be awaiting the processing of the request. Therefore, the receipt of this second response will be dealt with as a response received at step 108, FIG. 1. Namely, the request will be processed by the error handling of the requesting application, step 112, and the application will continue to await a call back from the operating system, step 110.

Regardless of whether the resource request was authentic, routine 400, in the exemplary configuration, audit the API request. Auditing requires making a record of the resource request intercepted by the process authentication routine. Such a record can be made by creating a log of all resource requests, either in storage device 310 of computer 300, or on the storage device associated with another networked computer, such as host 324 or server 330. In addition, the audit may be kept as a database. No matter the form of the audit, the routine may record such information as, the time of the request, the resource requested, the application making the request, the user logged onto the application, the machine's identification, the user group to which the user belongs, and whether or not the request was allowed. The audit may be kept either locally or on a networked computer, and in either case, a log may contain entries listed by one or more process authentication routines each running on different computers, although they may be networked together. Upon returning to step 406, routine 400 will listen for another broadcast.

Figure 5:
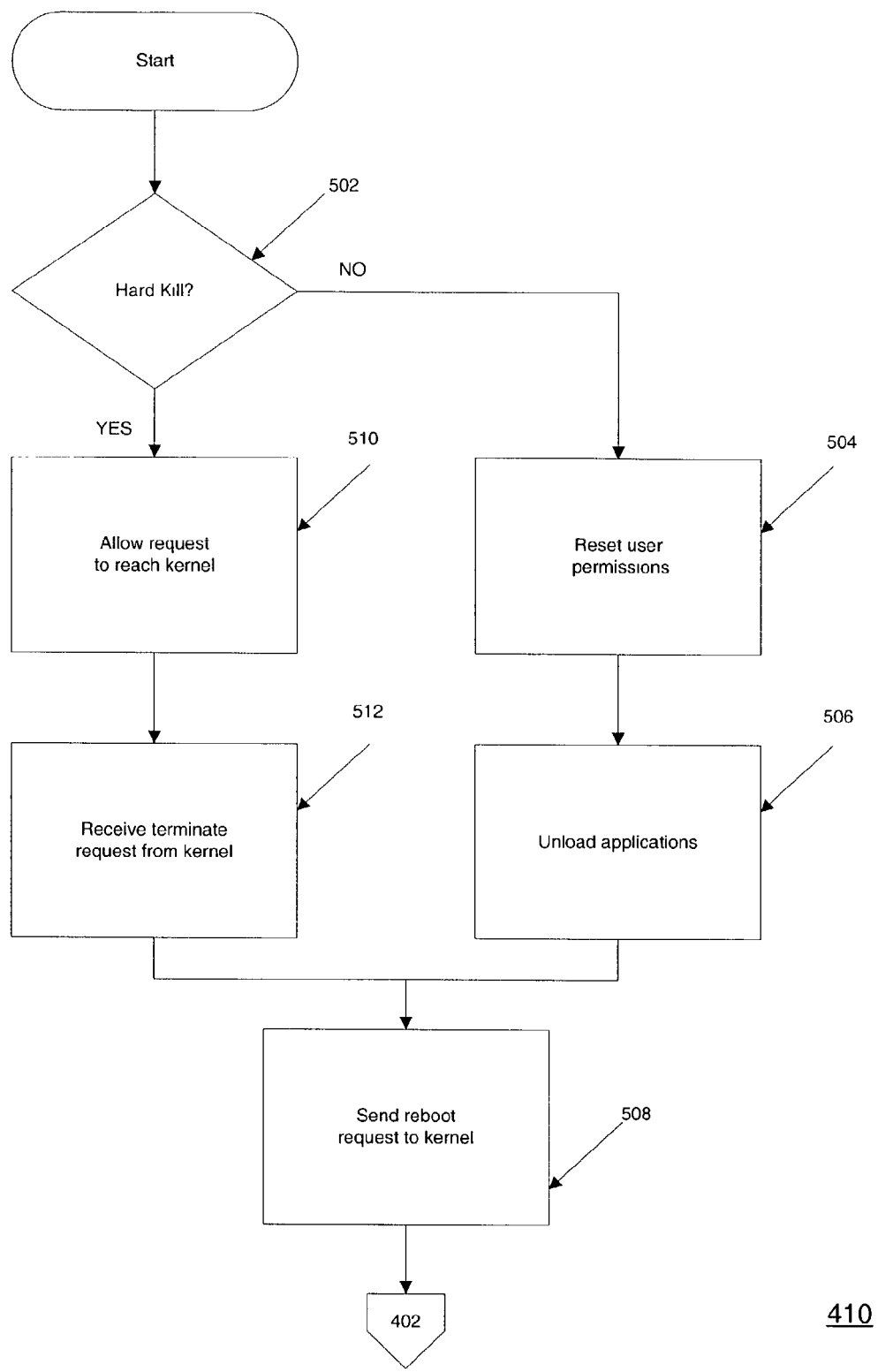
FIG. 5 shows a flowchart depicting the steps performed to prevent a process authentication routine from terminated independent of the computer system on which it is running, consistent with the principles of the present invention.

Referring now to FIG. 5, there is shown a flowchart depicting the steps performed by process authentication routine 400 to prevent its termination independent of the computer on which it is processing, step 410, FIG. 4. Typically, in Windows-based computers, there are two ways for an application to be terminated. First, an application may be asked to die. One example of this occurs when shutting down the computer. During shut down, the operating system requests each program to terminate so that it may shut down the computer. Second, a program may be killed. An example of this type of kill request occurs when a user of a Windows-based machine types control-alt-delete. In either case, routine 400 preferably will prevent its own termination. Otherwise, an unauthorized user could circumvent the process authentication routine by simply killing the routine.

When process authentication routine 400 receives a termination request from the operating system, it will first reset all user permissions, step 506. Resetting user permissions may include resetting all registry settings to the default settings such as those loaded at initial boot-up. Such settings might include logging any users off of computer 100 by modifying the registry settings to indicate that no user is currently logged on, or it might include modifying the registry settings to indicate that no applications are currently processing. One of ordinary skill in the art will recognize that the acts required to reset the permissions on a computer are highly dependent on the operating system and platform upon which the applications are operating. As a result, the systems and methods of the present invention require only that the user permissions be reset in a manner dictated by the computer on which the process is running.

Routine 400 will then unload all processing applications, step 508. Unloading the processing applications refers to terminating all processing applications prior to rebooting the computer. In one configuration, this may be accomplished by sending a terminate request to the operating system for each processing application. In another configuration, this may be accomplished by requesting that the operating system reboot the computer. Typically, the operating system, upon a request to reboot, will automatically terminate all processing applications. Finally, the routine will broadcast to the operating system a request to reboot the computer, step 610. Once the computer is rebooted, the process authentication routine will again be loaded into RAM (step 402, FIG. 4).

If the kill request is instead a hard kill, process authentication routine 400 will receive the request as an intercepted API request bound for the operating system. However, routine 400 may allow the hard kill request to reach the operating system, step 510. In one configuration, the routine intercepts, authenticates, and rebroadcasts the request to the operating system. In another configuration, if the process authentication routine detects a hard kill request, it may simply not intercept the request, instead allowing the request to reach and be processed by the operating system, without authentication.

In another configuration, routine 400 may merely deny the permission to all users and computer entities to request the termination of routine 400. In this case, routine 400 will intercept the request, checked the permissions list to determine whether it is a permitted request, determine that it is not a permitted request, and not rebroadcast as with other unauthorized API's, allowing the request to simply time out. However, routine 400 runs the risk that the operating system will respond to the request and terminate routine 400 before it can intercept the request.

In the cases where routine 400 allows the operating system to receive and process the kill request, routine 400 will continue as follows. Once the kill request reaches the operating system, the operating system will send a hard kill request to the process authentication routine, step 512. As part of its shut down routine, the systems and methods consistent with the present invention will then send a reboot request to the operating system, step 508. Upon reboot, the process authentication application will reload (step 402, FIG. 4), thus preventing the computer from processing without the process authentication application running at all times.

A digital imprint may also be included as part of process authentication, consistent with the principles of the present invention. Digital imprinting ensures that any file being executed is an original document. A digital imprint consists of a segment of binary code, such as an individual line of code, written to a file that is unique for specific workstation. No two workstations will ever have the same digital imprint because the imprint code is generated randomly. A process authentication routine reads any file on a workstation (for example, using the API request for file input/output) that is attempting to execute or request a resource, and looks for a digital imprint. If the imprint does not exist, access is denied.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for a process authentication entity to authenticate API requests made in a data processing system comprising an operating system and a system bus, the computer-implemented method comprising:

monitoring the system bus for Application Programming Interface (API) requests made to the operating system by an application;

retrieving, from the system bus, a selected one of the API requests made to the operating system by the application, the selected API request also being received by the operating system over the system bus;

requesting that the operating system not respond to the selected API request also received by the operating system;

responding to the application that made the selected API request to the operating system, in place of a response the application expects to receive from the operating system;

authenticating the selected API request by referring to a permissions list; and sending the authenticated selected API request over the system bus to the operating system if the API request is authenticated, thereby:

providing the selected API request to the operating system again, and allowing the operating system to process the authenticated selected API request, wherein the selected API request is allowed to time out if the selected API request is not authenticated.

2. The method of claim 1, further comprising broadcasting, to the operating system, a request to terminate processing of the intercepted API request.

3. The method of claim 1, wherein the response to the application mimics the expected response by the operating system.

4. The method of claim 1, wherein the authenticating further comprises verifying a digital imprint on the requesting application.

5. A computer readable storage device comprising instructions for carrying out a computer-implemented method for a process authentication entity to authenticate requests made in a data processing system comprising an operating system and a system bus, the computer-implemented method comprising:

monitoring the system bus for Application Programming Interface (API) requests made to the operating system by an application;

retrieving, from the system bus, a selected one of the API requests made to the operating system by the application, the selected API request also being received by the operating system over the system bus;

requesting that the operating system not respond to the selected API request also received by the operating system;

responding to the application that made the selected API request to the operating system, in place of a response the application expects to receive from the operating system;

authenticating the selected API request by referring to a permissions list; and sending the authenticated selected API request over the system bus to the operating system if the API request is authenticated, thereby:

providing the selected API request to the operating system again, and allowing the operating system to process the authenticated selected API request, wherein the selected API request is allowed to time out if the selected API request is not authenticated.

6. The computer readable storage device of claim 5, further comprising broadcasting, to the operating system, a request to terminate processing of the intercepted API request.

7. The computer readable storage device of claim 5, wherein the response to the application mimics the expected response by the operating system.

8. The computer readable storage device of claim 5, wherein the authenticating further comprises verifying a digital imprint on the requesting application.

9. The computer readable storage device of claim 5, further comprising preventing the data processing system from caching processing of the method.

10. The computer readable storage device of claim 9, wherein the method is implemented in a Windows-based computer, and the preventing comprises registering as a shell extension.

11. The computer readable storage device of claim 5, further comprising preventing the method from being prematurely terminated without terminating all processing of the data processing system.

12. The computer readable storage device of claim 11, wherein the preventing comprises transmitting a reboot request to an operating system in response to an attempt to terminate the method.

13. A system comprising:

an operating system;

a system bus; and a process authentication entity configured to:

monitor the system bus for Application Programming Interface (API) requests made to the operating system by an application;

retrieve, from the system bus, a selected one of the API requests made to the operating system by the application, the selected API request also being received by the operating system over the system bus;

request that the operating system not respond to the selected API request also received by the operating system;

respond to the application that made the selected API request to the operating system, in place of a response the application expects to receive from the operating system;

authenticate the selected API request by referring to a permissions list; and send the authenticated selected API request over the system bus to the operating system if the API request is authenticated, thereby:

providing the selected API request to the operating system again, and allowing the operating system to process the authenticated selected API request, wherein the selected API request is allowed to time out if the selected API request is not authenticated.

14. The system of claim 13, wherein the process authentication entity is further configured to broadcast, to the operating system, a request to terminate processing of the intercepted API request.

15. The system of claim 13, wherein the response to the application mimics the expected response by the operating system.

16. The system of claim 13, wherein the process authentication entity authenticates the selected API request by verifying a digital imprint of the requesting application.

17. The system of claim 13, wherein the process authentication entity is prevented from being cached.

18. The system of claim 17, wherein the process authentication entity is implemented in a Windows-based computer, and registers as a shell extension to prevent from being cached.

19. The system of claim 13, wherein the process authentication entity is prevented from being prematurely terminated without terminating all processing of the system.

20. The system of claim 19, wherein the process authentication entity prevents premature termination by transmitting a reboot request to the operating system in response to an attempt to terminate the process authentication entity.

21. A computer-implemented method for a process authentication entity to provide security in a data processing system comprising a system bus, the computer-implemented method comprising:
monitoring the system bus for resource requests made by a resource requesting entity and addressed to a resource allocating entity, the resource allocating entity being responsible for allocating resources to the resource requesting entity;
retrieving a first one of the resource requests from the system bus, wherein the first resource request is broadcast by the resource requesting entity and intended for the resource allocating entity to receive and allocate resources to the resource requesting entity;
transmitting, by the process authentication entity, a response to first resource request broadcast by the resource requesting entity and intended for the resource allocating entity;
transmitting a request that the resource allocating entity terminate processing of the first resource request broadcast by the resource requesting entity, thereby preventing the resource allocating entity from continued processing of the first resource request broadcast by the resource requesting entity;
accessing a permissions list stored in a memory to determine whether the first resource request is permitted by the permissions list; and
rebroadcasting, by the process authentication entity, the first resource request over the system bus provided that the first resource request is permitted by the permissions list, thereby providing the resource allocating entity with the rebroadcast first resource request and allowing the resource allocating entity to process the rebroadcast first resource request rather than the first resource request made by the resource requesting entity,
wherein the resource allocating entity allocates resources to the resource requesting entity based on the first resource request broadcast by the process authentication entity.

22. The method of claim 21, wherein the response transmitted by the process authentication entity mimics a response that the resource requesting entity expects from the resource allocating entity.

23. The method of claim 21, wherein the resource allocating entity is an operating system of the data processing system.

24. A computer-implemented method for a process authentication entity to authenticate messages in a data processing system comprising a system bus, the computer-implemented method comprising:
monitoring the system bus for messages sent by a sending entity and intended for a receiving entity, wherein the messages relate to processing requested by the sending entity which is to be performed by the receiving entity;
retrieving, by the process authentication entity, a first one of the messages from the system bus, the first message having been broadcasted on the system bus by the sending entity and received by the receiving entity;
transmitting a request to the receiving entity that the receiving entity not respond to the first message sent by the sending entity, received by the receiving entity, and retrieved from the system bus by the process authentication entity;
verifying that the sending entity is authorized to send the first message received by the receiving entity and retrieved from the system bus by the process authentication entity; and
rebroadcasting, by the process authentication entity, the first message on the system bus, provided that the sending entity is authorized to send the message, thereby providing the receiving entity with both the first message sent by the receiving entity and the first message rebroadcast by the process authentication entity,
wherein the receiving entity processes the first message rebroadcast by the process authentication entity in place of the first message sent to the receiving entity by the sending entity, thus providing the sending entity with the processing requested from the receiving entity.

25. The method of claim 24, wherein the method further comprises transmitting a response to the sending entity by the process authentication entity, the response representing to the sending entity that the receiving entity received the broadcast message.

26. A computer readable storage device containing instructions for executing a computer-implemented method for a process authentication entity to provide security in a data processing system comprising a system bus, the computer-implemented method comprising:
monitoring the system bus for resource requests made by a resource requesting entity and addressed to a resource allocating entity, the resource allocating entity being responsible for allocating resources to the resource requesting entity;
retrieving a first one of the resource requests from the system bus, wherein the first resource request is broadcast by the resource requesting entity and intended for the resource allocating entity to receive and allocate resources to the resource requesting entity;
transmitting, by the process authentication entity, a response to first resource request broadcast by the resource requesting entity and intended for the resource allocating entity;
transmitting a request that the resource allocating entity terminate processing of the first resource request broadcast by the resource requesting entity, thereby preventing the resource allocating entity from continued processing of the first resource request broadcast by the resource requesting entity;

accessing a permissions list stored in a memory to determine whether the first resource request is permitted by the permissions list; and rebroadcasting, by the process authentication entity, the first resource request over the system bus provided that the first resource request is permitted by the permissions list, thereby providing the resource allocating entity with the rebroadcast first resource request and allowing the resource allocating entity to process the rebroadcast first resource request rather than the first resource request made by the resource requesting entity, wherein the resource allocating entity allocates resources to the resource requesting entity based on the first resource request broadcast by the process authentication entity.

27. A computer readable storage device containing instructions for executing a computer-implemented method for a process authentication entity to authenticate messages in a data processing system comprising a system bus, the computer-implemented method comprising:

monitoring the system bus for messages sent by a sending entity and intended for a receiving entity, wherein the messages relate to processing requested by the sending entity which is to be performed by the receiving entity;

retrieving, by the process authentication entity, a first one of the messages from the system bus, the first message having been broadcasted on the system bus by the sending entity and received by the receiving entity;

transmitting a request to the receiving entity that the receiving entity not respond to the first message sent by the sending entity, received by the receiving entity, and retrieved from the system bus by the process authentication entity;

verifying that the sending entity is authorized to send the first message received by the receiving entity and retrieved from the system bus by the process authentication entity; and rebroadcasting, by the process authentication entity, the first message on the system bus, provided that the sending entity is authorized to send the message, thereby providing the receiving entity with both the first message sent by the receiving entity and the first message rebroadcast by the process authentication entity, wherein the receiving entity processes the first message rebroadcast by the process authentication entity in place of the first message sent to the receiving entity by the sending entity, thus providing the sending entity with the processing requested from the receiving entity.

28. The method according to claim 1, wherein access to the permissions list is restricted by requiring the use of an API request to modify the permissions list.

29. The method according to claim 1, wherein access to the permissions list is restricted by encrypting the permissions list.

30. A system comprising:
a system bus; and
a process authentication entity configured to:
monitor the system bus for resource requests made by a resource requesting entity and addressed to a resource allocating entity, the resource allocating entity being responsible for allocating resources to the resource requesting entity;

retrieve a first one of the resource requests from the system bus, wherein the first resource request is broadcast by the resource requesting entity and intended for the resource allocating entity to receive and allocate resources to the resource requesting entity;

transmit a response to first resource request broadcast by the resource requesting entity and intended for the resource allocating entity;

transmit a request that the resource allocating entity terminate processing of the first resource request broadcast by the resource requesting entity, thereby preventing the resource allocating entity from continued processing of the first resource request broadcast by the resource requesting entity;

access a permissions list stored in a memory to determine whether the first resource request is permitted by the permissions list; and rebroadcast the first resource request over the system bus provided that the first resource request is permitted by the permissions list, thereby providing the resource allocating entity with the rebroadcast first resource request and allowing the resource allocating entity to process the rebroadcast first resource request rather than the first resource request made by the resource requesting entity, wherein the resource allocating entity allocates resources to the resource requesting entity based on the first resource request broadcast by the process authentication entity.

31. A system comprising:
a system bus; and
a process authentication entity configured to:
monitor the system bus for messages sent by a sending entity and intended for a receiving entity, wherein the messages relate to processing requested by the sending entity which is to be performed by the receiving entity;

retrieve a first one of the messages from the system bus, the first message having been broadcasted on the system bus by the sending entity and received by the receiving entity;

transmit a request to the receiving entity that the receiving entity not respond to the first message sent by the sending entity, received by the receiving entity, and retrieved from the system bus by the process authentication entity;

verify that the sending entity is authorized to send the first message received by the receiving entity and retrieved from the system bus by the process authentication entity; and rebroadcast the first message on the system bus, provided that the sending entity is authorized to send the message, thereby providing the receiving entity with both the first message sent by the receiving entity and the first message rebroadcast by the process authentication entity, wherein the receiving entity processes the first message rebroadcast by the process authentication entity in place of the first message sent to the receiving entity by the sending entity, thus providing the sending entity with the processing requested from the receiving entity.

* * * * *

UNITED STATES PATENT AND TRADEMARK OFFICE
CERTIFICATE OF CORRECTION

PATENT NO. : 7,624,439 B2 Page 1 of 1
APPLICATION NO. : 10/252511
DATED : November 24, 2009
INVENTOR(S) : Luke Koestler It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1066 days.

Signed and Sealed this

Twenty-sixth Day of October, 2010

David J. Kappos
*Director of the United States Patent and Trademark Office*